Patented Nov. 21, 1950

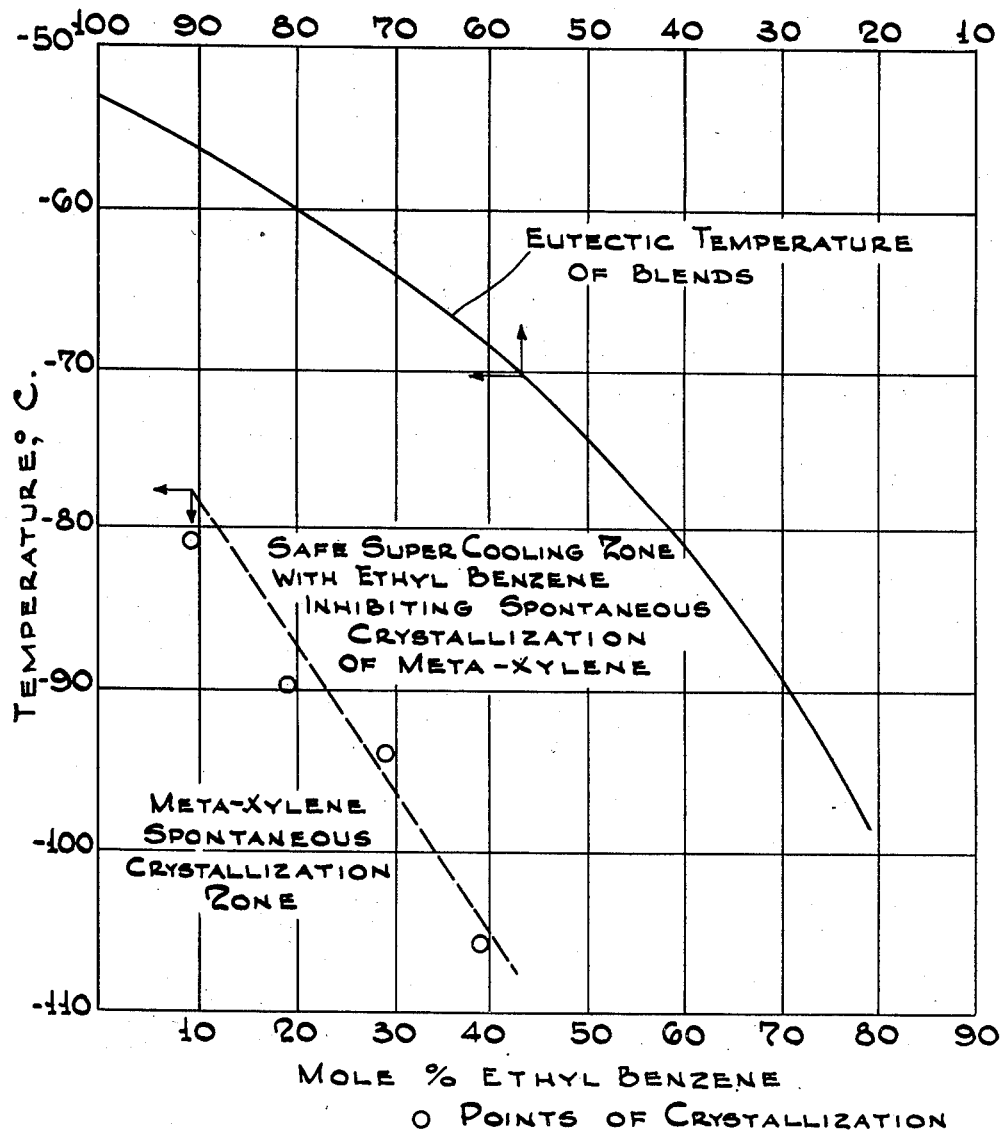

2,530,978

UNITED STATES PATENT OFFICE 2,530,978

ISOLATION OF XYLENE ISOMERS

David M. Mason, Linden, N. J., assignor to Standard Oil Development Company, a corporation of Delaware Application August 8, 1946, Serial No. 689,137

11 Claims. (Cl. 260—674)

This invention relates to a method for isolation of para-xylene and meta-xylene from crude xylenes and from mixtures of hydrocarbons containing xylenes. More particularly, the invention is concerned with separation of para-xylene by selective fractional crystallization of a liquid mixture of the isomers in the presence of a third component which inhibits spontaneous crystallization of meta-xylene and permits the formation of a ternary system having a much lower eutectic than the binary eutectic of meta- and para-xylene.

The xylenes (o-, m-, and p-) are principally present in certain petroleum and coal tar products. o-Xylene under atmospheric pressure boils at 144.4° C. m-Xylene and p-xylene normally boil at 139.2° C. and 138.5° C., respectively. It is possible, therefore, to separate o-xylene from m- and p-xylenes in substantially pure form by fractional distillation. Separation of m-xylene from p-xylene is not practically feasible by fractional distillation. Chemical methods have been useful for obtaining separated concentrates of p- and m-xylenes but the purity and yields of the chemically separated products require improvement.

It is known that to some extent p-xylene may be recovered from a mixture of m- and p-xylene by fractional crystallization at temperatures below 11° C. However, these isomers form a solid eutectic mixture at a temperature of about —53° C., and this mixture contains 87 parts by weight of meta- to 13 parts by weight of para-xylene. For example, from a concentrate containing 71% meta, 21% para, and 8% of other aromatic hydrocarbons, cooled to just above the eutectic point, only about half the para-xylene is crystallized out, and the other half remains as an impurity with the meta-xylene concentrate. Consequently, efforts were made to cool to temperatures below the binary eutectic point by use of certain third components, such as several alcohols and hydrocarbons, which in effect give rise to a potential ternary system with its own ternary eutectic temperature which is lower than the binary eutectic temperature of meta- and para-xylene. Still, in actual practice it was found difficult to use these third components because they did not permit extensive controlled cooling, which is important for obtaining a maximum degree of separation when the mixed solid and liquid phases are cooled to a temperature below the true binary eutectic point.

A principal object of this invention is to provide a practical process for separating first para-xylene as crystals from supercooled mixed para and meta isomers at temperature below the binary eutectic point of the mixture in the presence of an inhibitor of crystallization of the meta-xylene, then separating meta-xylene crystals from the resulting supercooled liquid mixture nearly freed of para-xylene.

It has now been found that, after the removal of substantially all the ortho-xylene from a mixture of xylene isomers by fractional distillation, by conducting the crystallization of para-xylene in the presence of certain inhibitors of crystallization for meta-xylene in suitable proportion, the mixture blended with the inhibitor can be cooled to very low temperatures, of the order of 15 to 30 centigrade degrees below the eutectic points of the blends so as to cause a greater proportion of the para-xylene to crystallize and separate out. After separation of the para-xylene from the thus-cooled meta-xylene, crystallization of the meta-xylene may be induced by seeding and a substantial portion of the meta-xylene may be crystallized and separated.

In using previously proposed third components, such as the alcohols and the low boiling hydrocarbons, the spontaneous crystallization points of the diluted mixtures are lowered erratically a few degrees, e. g., to about —60° C. or thereabouts, by 20 mole per cent of the third components. On the other hand, the dependable meta-xylene crystallization inhibitors suitable for cooling, such as ethyl benzene, isoheptene, and meta-ethyl toluene, in proportions of 20 mole per cent inhibit spontaneous crystallization of meta-xylene in the isomer mixtures at temperatures as low as —85° C. and lower, and permit dependable cooling.

In general, according to the present invention, an aromatic fraction boiling between 136° C. and 144° C. and of high xylene content is fractionated to separate a cut boiling between 136° C. and 141° C. and which contains predominantly meta- and para-xylenes. Any of the distillations necessary in carrying out the process of the present invention can be accomplished by use of available distillation equipment. The xylene fraction boiling between 136° C. and 141° C. is placed in a vessel designed for carrying out cooling and crystallization. This is equipped with a stirrer and the proper connections for introducing the cooling medium into the jacketed part of the kettle. From 1/10 to 1 volume of the meta-xylene crystallization inhibitor is added per volume of the xylene distillate placed in the kettle or crystallization vessel. A cooling medium, such as liquefied ethylene or other refrigerant, capable of lowering the contents of the kettle down to temperatures of the order of $-70°$ C. and lower, is introduced into the jacketed part of the apparatus, and the mixture in the apparatus is cooled to a temperature below $-70°$ C. but not to the point where the meta-xylene spontaneously crystallizes. During the cooling process, crystals of para-xylene continue to form until nearly all of the para-xylene is crystallized.

After separation of the para-xylene crystals from the cooled mother liquor containing meta-xylene, the mother liquor is warmed to slightly below the meta-xylene saturation temperature. Crystallization of meta-xylene is induced by seeding with crystals or otherwise, and cooling is again applied, whereupon the meta-xylene crystallizes out until the temperature approaches the equilibrium eutectic point of meta-xylene, para-xylene and the inhibitor. After separation of the meta-xylene crystals from the mother liquor, the resultant liquid equilibrium mixture contains para-xylene and meta-xylene in the ratio of approximately 11:89. The remaining liquid may be admixed with a fresh supply of xylene distillate to be subjected to a similar fractional crystallization, or may be employed for motor fuel or solvent use. The inhibitor may be recovered for reuse, if desirable.

The para-xylene crystals may be removed from the liquid mixture undergoing cooling by filtration. The meta-xylene crystals may be removed likewise from the seeded mother liquor. The filtrations may be accomplished either by basket type centrifuging or by means of a suction filter. Any other convenient means of separating the crystals from the liquid phases may be used.

Alternatively, some or all of the ethyl benzene present in the original xylene mixture may be retained therein to serve as a crystallization inhibitor. Additional ethyl benzene or one of the other inhibitors, preferably meta-ethyl toluene, may be added; then the process may be carried out as described above.

In the accompanying drawing is shown a graph indicating the eutectic temperatures and the temperatures to which the xylene mixtures may be cooled without spontaneous crystallization when inhibited with varying proportions of ethyl benzene. Isoheptene and meta-ethyl toluene in varying proportions have similar effects, the latter even expanding the safe cooling zone.

Details of the invention will be understood from the following examples given for the purpose of illustration.

Example 1

A xylene distillate freed of ortho-xylene was blended with ethyl benzene until the resulting blend contained 20% para-xylene; 38% meta-xylene; and 35% ethyl benzene, the remainder being other $C_8$ hydrocarbons. This blend was cooled by liquid ethylene to a temperature of $-90°$ C., and 90% of the para-xylene was crystallized and removed by filtration. After separation of the para-xylene crystals, the cooled mother liquor contained 2½% para-xylene and 45% meta-xylene. After warming to $-77°$ C., crystallization of meta-xylene was induced by seeding the mother liquor, which was again cooled to a final temperature of $-86°$ C. while meta-xylene crystals were formed. Approximately 50% of the original meta-xylene was recovered in the meta-xylene crystals thus formed and separated from the residual mother liquor.

Example 2

A crude xylene fraction to be processed contained:

| | Per cent |
|---|---|
| Para-xylene | 26 |
| Meta-xylene | 68 |
| Other $C_8$ aromatics | 6 |

The crude xylene was blended with meta-ethyl toluene concentrate (80%) until the blend contained 20 mole per cent meta-ethyl toluene concentrate. This blend was cooled to temperatures lower than $-94°$ C. without crystallization. In safely cooling this blend, approximately 85% of the para-xylene crystallized, leaving a liquor containing meta-xylene in a ratio of 95 to 5 of para-xylene.

The ethyl toluene was removed from the liquor by distillation, then 65% of the meta-xylene crystallized and was separated on cooling the liquor to $-60°$ C.

Example 3

A crude xylene fraction as in Example 2 was blended with an isomeric branched heptene mixture (a mixture of methylhexenes and dimethylpentenes) to 20 mole per cent content of the heptenes. The blend was cooled to nearly $-90°$ C. without crystallization.

With safe dependable cooling of the blend, about 85% of the para-xylene was crystallized and separated leaving a liquor having a meta to para ratio of 94½ to 5½.

The heptenes were removed from the resulting liquor by distillation, after which 60% of the meta-xylene was crystallized out before the liquor reached its eutectic point, at which the meta to para ratio is 87.5 to 12.5.

It will be noted that by using the potent inhibitors of meta-xylene crystallization, first nearly all the para-xylene is isolated, then a large proportion of the meta-xylene can be isolated from the mother liquor which yielded the para-xylene crystals. The potent inhibitors give safely assured cooling to increase the concentration of the meta-xylene in the remaining liquid phase or mother liquor as para-xylene is crystallized and separated.

There has been no basis for prediction of substances which act as potent crystallization inhibitors preferentially toward one of the isomers, but it may be noted from results obtained in accordance with the present invention that the potent inhibitors have in common at least 7 carbon atoms per molecule, doubly bonded carbons, and an alkyl side chain. The structural orientation of these substances may be such as to block crystallization of the meta-xylene.

I claim:

1. The method of recovering substantially pure para-xylene from mixtures thereof with meta-xylene which comprises forming a liquid solution of meta- and para-xylene with a third component selected from the class consisting of ethyl benzene, meta-ethyl toluene, and a mixture of methyl hexenes and dimethyl pentenes, cooling the solution to a temperature below $-53°$ C. but above the eutectic temperature of the system: meta-xylene — para-xylene — third component, whereby para-xylene crystals are formed and meta-xylene is inhibited from crystallizing spontaneously by the action of the third component, and removing substantially pure para-xylene crystals from the cooled solution.

2. The method of recovering substantially pure para-xylene and substantially pure meta-xylene from mixtures thereof which comprises forming a liquid solution of meta- and para-xylene with a third component selected from the class consisting of ethyl benzene, meta-ethyl toluene, and a mixture of methyl hexenes and dimethyl pentenes, cooling the solution to a temperature below $-53°$ C. but above the eutectic temperature of the system: meta-xylene—para-xylene—third component, whereby para-xylene crystals are formed and meta-xylene is inhibited from crystallizing spontaneously by the action of the third component, removing substantially pure para-xylene crystals from the cooled solution, inducing crystallization of meta-xylene in the cooled solution, and separating substantially pure meta-xylene crystals from the cooled solution.

3. The method according to claim 2 wherein the crystallization of meta xylene is induced by removing the meta xylene crystallization inhibitor and thereafter cooling the xylene solution freed of the inhibitor to a temperature below the melting point of meta xylene.

4. The method according to claim 2 wherein the crystallization of meta xylene is induced by seeding the cooled solution with meta xylene crystals.

5. A process according to claim 2 in which the third component is ethyl benzene.

6. A process according to claim 2 in which the third component is meta-ethyl toluene.

7. A process according to claim 2 in which the third component is a mixture of methyl hexenes and dimethyl pentenes.

8. A process according to claim 2 in which the solution contains at least 20 mol. per cent of the third component as the solution is cooled to a temperature between $-50°$ C. and $-94°$ C.

9. The method of recovering substantially pure para-xylene and substantially pure meta-xylene from mixtures thereof which comprises forming a liquid solution of meta- and para-xylene with ethyl benzene, cooling the solution to a temperature below $-53°$ C. but above the eutectic temperature of the system: meta-xylene—para-xylene—ethyl benzene, whereby para-xylene crystals are formed and meta-xylene is inhibited from crystallizing spontaneously by the action of the ethyl benzene, removing the substantially pure para-xylene crystals from the cooled solution, removing ethyl benzene from the solution, again cooling the solution to a temperature below the melting point of meta-xylene and separating substantially pure meta-xylene crystals from the solution.

10. The method as described in claim 9, in which the solution contains at least about 20 mole per cent of the diluent as the solution is cooled below $-60°$ C.

11. The method of recovering substantially pure para-xylene and substantially pure meta-xylene from mixtures thereof which comprises forming a liquid solution of meta- and para-xylene with ethyl benzene, cooling the solution to a temperature below $-53°$ C. but above the eutectic temperature of the system: meta-xylene — para-xylene — ethyl benzene, whereby para-xylene crystals are formed and meta-xylene is inhibited from crystallizing spontaneously by the action of the third component, removing substantially pure para-xylene crystals from the cooled solution, seeding the cooled solution with meta-xylene crystals whereby meta-xylene in the cooled solution crystallizes out and recovering substantially pure meta-xylene crystals from the cooled solution.

DAVID M. MASON.

REFERENCES CITED

The following references are of record in the file of this patent:

UNITED STATES PATENTS

| Number | Name | Date |
|---|---|---|
| 2,398,526 | Greenburg | Apr. 16, 1946 |
| 2,402,158 | Glowacki et al. | June 18, 1946 |
| 2,435,792 | McArdle et al. | Feb. 10, 1948 |

OTHER REFERENCES

Ganot: Elementary Treatise on Physics; 15th Edition, 1901, Published by Wm. Wood & Co. in New York, N. Y.